US005989650A

United States Patent [19]

Inamoto et al.

[11] Patent Number: 5,989,650

[45] Date of Patent: Nov. 23, 1999

[54] RECORDING MEDIUM, INK-JET RECORDING METHOD AND PRINTED PRODUCT

[75] Inventors: Tadayoshi Inamoto, Hachioji; Shinichi Tochihara, Hadano, both of Japan

[73] Assignee: Canon Kabushiki Kaisha, Tokyo, Japan

[21] Appl. No.: 08/831,758

[22] Filed: Apr. 1, 1997

[30] Foreign Application Priority Data

| | | | |
|---|---|---|---|
| Apr. 4, 1996 | [JP] | Japan | 8-106407 |
| Feb. 14, 1997 | [JP] | Japan | 9-044848 |

[51] Int. Cl.$^{6}$ .............................. B05D 3/06; B05D 5/04; C08F 2/46

[52] U.S. Cl. ....................... 427/487; 427/261; 427/407.1; 427/504; 427/511; 427/558; 427/552

[58] Field of Search .................................... 427/487, 411, 427/412.1, 412.5, 412.2, 412.3, 500, 504, 511, 552, 558, 288, 407.1, 261, 267, 496

[56] References Cited

U.S. PATENT DOCUMENTS

| | | | |
|---|---|---|---|
| 4,289,838 | 9/1981 | Rowe et al. | 430/163 |
| 4,503,111 | 3/1985 | Jaegar et al. | 428/195 |
| 4,771,078 | 9/1988 | Schisler et al. | 521/50.5 |
| 4,877,680 | 10/1989 | Sakaki et al. | 428/332 |
| 5,068,282 | 11/1991 | Kanto et al. | 525/61 |
| 5,102,731 | 4/1992 | Takimoto et al. | 428/195 |
| 5,320,897 | 6/1994 | Kondo et al. | 428/195 |
| 5,429,860 | 7/1995 | Held et al. | 427/261 |
| 5,500,668 | 3/1996 | Malhorta et al. | 347/105 |
| 5,518,821 | 5/1996 | Sakaki et al. | 428/195 |
| 5,747,146 | 5/1998 | Kashiwazaki et al. | 428/195 |
| 5,798,397 | 8/1998 | Noguchi et al. | 427/146 |

FOREIGN PATENT DOCUMENTS

| | | |
|---|---|---|
| 54-59936 | 5/1979 | Japan . |
| 55-146786 | 11/1980 | Japan . |
| 57-102391 | 6/1982 | Japan . |
| 58-89391 | 5/1983 | Japan . |
| 60-67190 | 4/1985 | Japan . |
| 60-220750 | 11/1985 | Japan . |
| 61-61887 | 3/1986 | Japan . |
| 63-221077 | 9/1988 | Japan . |
| 3-29596 | 4/1991 | Japan . |
| 4-67986 | 3/1992 | Japan . |
| 4-320877 | 11/1992 | Japan . |
| 5-221112 | 8/1993 | Japan . |
| 5-262028 | 10/1993 | Japan . |
| 5-309956 | 11/1993 | Japan . |
| 7-1828 | 1/1995 | Japan . |
| 7-40649 | 2/1995 | Japan . |

OTHER PUBLICATIONS

Patent Abstracts of Japan, Pub. No. 07040649, Feb. 10, 1995 "Active Energy Curing Resin Composition".

*Primary Examiner*—Diana Dudash
*Attorney, Agent, or Firm*—Fitzpatrick, Cella, Harper & Scinto

[57] ABSTRACT

A recording medium is composed of a substrate and an ink receiving layer provided on at least one side of the substrate, wherein the ink receiving layer is composed of a composition or a cured product thereof containing at least (A) a polyvinyl acetal resin having acetal groups, acetyl groups and hydroxyl groups, (B) a monomer having an active energy ray curable ethylenic unsaturated group, and (C) a cationic resin, at a ratio (B)/(A) within the range of 1/100 to 5/1, and a ratio (C)/((A)+(B)) of 0.5/100 to 30/100.

6 Claims, No Drawings

RECORDING MEDIUM, INK-JET RECORDING METHOD AND PRINTED PRODUCT

BACKGROUND OF THE INVENTION

1. Field of the Invention

The present invention relates to a recording medium suitable for use in ink jet recording, an ink jet recording method using the same and a printed product.

2. Description of the Prior Art

Conventional recording media used for ink jet recording include a recording sheet comprising an ink receiving layer consisting of acetal-modified polyvinyl alcohol, as disclosed in Japanese Patent Laid-Open Nos. 63-221077, 5-221112, 5-262028 and 7-1828; a recording sheet comprising an ink receiving layer consisting of polyvinyl alcohol and polyvinyl pyrrolidone, as disclosed in Japanese Patent Laid-Open No. 55-146786; a recording sheet comprising an ink receiving layer mainly consisting of polyvinyl pyrrolidone, as disclosed in Japanese-Patent Publication No. 3-29596; a recording sheet comprising an ink receiving layer consisting of polyvinyl alcohol and polyvinyl butyral, as disclosed in Japanese Patent Laid-Open No. 57-102391; a recording sheet comprising an ink receiving layer consisting of a crosslinked water-soluble resin, as disclosed in Japanese Patent Laid-Open No. 58-89391; a recording sheet having excellent resistance to fingerprint marks and comprising an ink receiving layer consisting of a polyester resin, as disclosed in Japanese Patent Laid-Open No. 5-309956; a recording sheet comprising an ink receiving layer provided on a polyester film and consisting of water-soluble polyvinyl alcohol having a degree of saponification of 70 to 90%, as disclosed in Japanese Patent Laid-Open No. 60-220750; a recording sheet comprising an ink receiving layer consisting of a water-soluble metallic salt with more than two valencies and a cationic organic material, as disclosed in Japanese Patent Laid-Open No. 60-67190; and a recording sheet comprising an ink receiving layer containing a polyallylamine derivative as a cationic resin, as disclosed in Japanese Patent Laid-Open No. 61-61887. In addition, Japanese Patent Laid-Open No. 7-40649 discloses a recording sheet having an ink receiving layer consisting of an active energy ray curable resin, and Japanese Patent Laid-Open No. 7-55581 discloses a recording sheet having polyoxyethylene as a skeleton and an ink receiving layer consisting of an active energy ray curable resin.

Recent improvements in the performance of ink jet recording apparatus, such as increased recording speed and realization of multicolor recording, have brought about the need for the ink jet recording medium to have a wide variety of high-performance characteristics.

Namely, the recording medium must simultaneously satisfy the following requirements:

(1) High ink absorbing power (high absorption capacity and high absorption speed);

(2) The ability to form dots with high optical density and clear peripheries;

(3) The ability to form substantially circular dots having smooth peripheries;

(4) Minimal change in printing characteristics and the prevention of curling due to changes in temperature and humidity;

(5) Anti-blocking property;

(6) Stability and the ability to stably maintain an image without deterioration in long-term storage (particularly, in an environment of high temperature and humidity);

(7) Resistance to fingerprint marks;

(8) Excellent water resistance of the ink receiving layer and the recording portion;

(9) Excellent adhesion between the ink receiving layer and the substrate; and

(10) Excellent coating properties of a coating solution for forming the ink receiving layer during the formation of the ink receiving layer.

Regarding the above-mentioned conventional recording media, the recording medium disclosed in Japanese Patent Publication No. 3-29596, which comprises an ink receiving layer mainly comprising polyvinyl pyrrolidone, has relatively good ink absorbing power at room temperature and normal humidity, but the ink dries very slowly at a high temperature and high humidity, thereby causing blocking. The recording medium also has the problem that the recording surface of the ink receiving layer has low mechanical strength and is thus easily damaged.

The recording medium disclosed in Japanese Patent Laid-Open No. 55-146786, which comprises an ink receiving layer comprising polyvinyl alcohol and polyvinyl pyrrolidone, has good ink absorption and fixing properties, but the recorded part and the ink receiving layer have poor water resistance.

The recording medium disclosed in Japanese Patent Laid-Open No. 57-102391, which comprises an ink receiving layer comprising polyvinyl alcohol and polyvinyl butyral, has the problem that the ink receiving layer has poor compatibility between the two resins.

The recording medium disclosed in Japanese Patent Laid-Open No. 60-220750, which comprises an ink receiving layer mainly comprising polyvinyl alcohol, is excellent in anti-blocking property and mechanical strength of the recording surface, but the recording medium has the problem that, when the recording medium is allowed to stand in an environment of high temperature and high humidity for a long time, it deteriorates, and the ink absorbing power deteriorates, and that, when an image is allowed to stand in an environment of high temperature and high humidity for a long time, the dots become blurred, and the image definition thus deteriorates.

The recording medium disclosed in Japanese Patent Laid-Open No. 58-89391, which comprises an ink receiving layer formed by crosslinking a water-soluble resin, is excellent in water resistance of the ink receiving layer, but it has poor ink absorption.

The recording medium disclosed in Japanese Patent Laid-Open No. 5-309956, which comprises an ink receiving layer mainly comprising a polyester resin, has excellent resistance to fingerprint marks, but it has other properties such as its ink receiving and long-term storage properties are very poor. Thus, the recording medium does not satisfy the above requirements.

The problems with respect to ink absorption and water resistance of the ink receiving layer can be solved to some extent by using polyvinyl acetal for forming the ink receiving layer, as disclosed in Japanese Patent Laid-Open Nos. 63-221077, 5-221112, 5-262028 and 7-1828. However, the image definition is not satisfactorily maintained, particularly when a recorded image is allowed to stand in an environment of high temperature and high humidity for a long time.

In addition, when the ink receiving layer is provided in a specified form on the recording medium, for example, when the ink receiving layer is provided on a plate-shaped substrate, a coating solution for forming the ink receiving layer flows to the circumference of the plate-shaped substrate, and thus must be printed in a pattern so as to prevent coating on the circumference of the plate-shaped substrate. Although a polyvinyl alcohol resin is solid and must be printed after being dissolved in some solvent, the resin has poor solubility to solvents, and thus has the problem of requiring a thick coating of the resultant resin solution because of the low solid content thereof. The resin solution also has poor leveling properties and anti-foaming properties, and thus has the problem of poor printing properties.

The recording medium disclosed in Japanese Patent Laid-Open Nos. 4-67986 and 4-320877, which comprises an ink receiving layer mainly comprising alumina hydrate, is satisfactory in ink absorption and anti-blocking property, but the water resistance of the ink receiving layer is insufficient because the binder component of the alumina hydrate is a water-soluble resin. The recording medium is also unsatisfactory in other properties, such as ink absorption capacity, curling, transparency and storage properties.

The ink receiving layer disclosed in Japanese Patent Laid-Open No. 7-40649, which is formed by using an active energy ray curable resin, has excellent water resistance and improved stability to changes in temperature and humidity, and the coating solution which forms the ink receiving layer has excellent printing properties. However, since the ink receiving layer has a high crosslink density, the ink receiving layer exhibits good ink jet printing properties in a recorded portion with a low printing duty, but the ink receiving layer cannot sufficiently absorb the ink applied to a recorded portion with a high printing duty and thus has the problem of causing color nonuniformity referred to as "beading" or bleeding at boundaries between adjacent different colors.

Like the ink receiving layer formed by using an active energy ray curable resin, the ink receiving layer disclosed in Japanese Patent Laid-Open No. 7-55581, which comprises polyoxyethylene as a skeleton and which is formed by using an active energy ray curable resin, cannot sufficiently absorb the ink applied to a recorded portion with a high printing duty, and thus has the problem of causing beading or bleeding at boundaries between different colors. The coating solution for forming the ink receiving layer also has poor coating properties for the substrate.

At present, the above-mentioned conventionally known techniques cannot produce a recording medium which simultaneously satisfies the above requirements,

SUMMARY OF THE INVENTION

Accordingly, an object of the present invention is to provide a recording medium which provides a good balance of the above-mentioned requirements, an ink jet recording method using the medium, and a recorded product obtained by the recording method. Particularly, an object of the present invention is to provide a recording medium by using a coating solution for an ink receiving layer which has excellent coating properties, i.e., anti-foaming properties and leveling properties, by coating the coating solution on a recording medium substrate. Another object of the present invention is to provide a recording medium which is excellent in water resistance, resistance to fingerprint marks, ink absorption capacity, ink fixing properties, adhesion between the ink receiving layer and the substrate, and water resistance of the recorded portion, and which causes no deterioration in image quality or the recording medium itself even when a recorded image is allowed to stand in an environment of high temperature and high humidity for a long time.

In order to achieve the above objects, the present invention provides a recording medium comprising a substrate and an ink receiving layer provided on at least one side of the substrate, wherein the ink receiving layer comprises a composition or a cured product thereof containing at least (A) a polyvinyl acetal resin having acetal groups, acetyl groups and hydroxyl groups, (B) a monomer having an active energy ray curable ethylenic unsaturated group, and (C) a cationic resin, at a ratio (B)/(A) by weight within the range of 1/100 to 5/1, and a ratio (C)/((A)+(B)) by weight within the range of 0.5/100 to 30/100.

The invention also provides an ink jet recording method wherein ink is applied to the recording medium to form an image, and a printed product produced by the ink jet recording method, The invention also provides methods of forming an image by applying an ink to a substrate. One method comprises the steps of:

(1) forming an ink receiving layer by coating, on at least one side of the substrate, a composition comprising (A) a polyvinyl acetal resin having acetal groups, acetyl groups and hydroxyl groups; (B) a monomer having an active energy ray curable ethylenic unsaturated group; and (C) a cationic resin at a weight ratio (B)/(A) within a range of 1/100 to 5/1, and a weight ratio (C)/((A)+(B)) within a range of 0.5/100 to 30/100;

(2) applying an ink to the ink receiving layer by an ink jet method to form an image; and then (3) applying active energy rays to the ink receiving layer to cure the ink receiving layer.

Another method of forming an image by applying an ink to a substrate comprises forming the ink receiving layer as described above, applying active energy rays to the ink receiving layer to cure it, and then applying ink to the ink receiving layer by an ink jet method to form an image.

DETAILED DESCRIPTION OF THE PREFERRED EMBODIMENTS

In development of a recording medium suitable for ink jet recording, the inventors found that a coating solution for forming an ink receiving layer comprising a composition containing the above components (A, (B) and (C) has excellent printing properties when coated on a substrate, and that the recording medium obtained has excellent performance with respect to ink absorption capacity, ink fixing properties, water resistance, image storage properties, resistance to fingerprint marks, and adhesion between the ink receiving layer and the substrate, is capable of forming dots with definition and sharpness and an image with excellent quality, undergoes minimal change in performance due to changes in environmental conditions such as temperature and humidity, and is stable in long-term storage, particularly, in an environment of high temperature and high humidity.

The use of a specified polyvinyl acetal resin as the component (A) as a main material of the ink receiving layer possibly improves the affinity of the formed ink receiving layer for ink, particularly, affinity for water, water-compatible glycols or glycol ethers, increases the ink absorbing power, and enables the formation of an image having clear and sharp ink dots. The recording medium comprising such an ink receiving layer also undergoes less change due to changes in environmental conditions such as temperature and humidity.

It was also found that the addition of a monomer having an active energy ray curable ethylenic unsaturated group to component (A) imparts excellent coating property for the substrate to the coating solution for forming the ink receiving layer, i.e., it improves leveling properties and anti-foaming properties, and is capable of further improving the water resistance of the formed ink receiving layer.

It was further found that, when the ink receiving layer is formed by using the above components (A) and (B) and a cationic resin in order to solve the above problems of an ink receiving layer formed by using a polyvinyl acetal resin, the image recorded on the ink receiving layer has improved water resistance and long-term storage stability in an environment of high temperature and high humidity.

It was further found that, when an alumina hydrate is added to components (A), (B) and (C) in accordance with a preferred embodiment, the coating solution for forming the ink receiving layer exhibits improved coating property for the substrate, and the recording medium obtained has improved performance with respect to image storage properties, resistance to fingerprint marks, ink fixing properties and ink absorption capacity, etc.

The present invention will be described in further detail below with reference to preferred embodiments.

The polyvinyl acetal resin used as component (A) of a coating solution for forming the ink receiving layer represents an addition and/or condensation reaction product of polyvinyl alcohol (referred to as "PVA" hereinafter) and an aldehyde compound. The addition and/or condensation reaction product of PVA and an aldehyde compound is obtained by addition and/or condensation reaction of PVA and an aldehyde compound having reactivity to the hydroxyl groups of PVA.

The PVA can be obtained by acid or alkali saponification of a vinyl acetate polymer or a copolymer of vinyl acetate and another copolymerizable monomer such as ethylene, propylene, vinyl chloride, (meth)acrylic acid or an ester thereof. The degree of saponification of the thus-obtained PVA is preferably about 75 to 99%, and the degree of polymerization of the PVA is preferably 500 to 3,500. However, the degrees of saponification and polymerization are not limited to these preferable ranges. Various types of PVA having the above degrees of saponification and polymerization can be used singly or in combination. PVA modified with various modifiers during production of the raw materials or after saponification, for example, cation-modified PVA, anion-modified PVA, and the like, may be used.

Examples of the aldehyde compound which is subjected to addition and/or condensation reaction with PVA include aliphatic saturated aldehydes such as formaldehyde, acetaldehyde, propionaldehyde, butyl aldehyde, isobutyl aldehyde, isopropyl aldehyde, valeraldehyde, isovaleraldehyde, and the like; aromatic aldehydes such as benzaldehyde, o-, m- or p-tolualdehyde, benzyl aldehyde, salicylaldehyde, cinnamaldehyde, α- or β-naphthaldehyde, and the like; heterocyclic aldehydes such as furfural and the like; aliphatic unsaturated aldehydes such as acrolein, crotonaldehyde, propriolaldehyde, hexenal, heptenal, and the like; aliphatic dialdehydes such as glyoxal, succindialdehyde, glutardialdehyde, adipodialdehyde, piperic dialdehyde, suberic dialdehyde, sebacic dialdehyde, and the like.

Of these aldehydes, aliphatic aldehydes such as isobutyl aldehyde, isopropyl aldehyde, and the like; aromatic aldehydes such as benzaldehyde, benzyl aldehyde, and the like are particularly preferable.

The degree of acetalization of the PVA with an aldehyde compound having reactivity to the hydroxyl groups of PVA depends upon the degree of saponification of the PVA, the degree of polymerization of the PVA, the degrees of hydrophilic nature and hydrophobic nature of the PVA and the aldehyde compound used as a modifier, and the required performance of the recording medium obtained. However, the degree of acetalization is a degree which does not cause excessive loss of the hydrophilic nature of the acetal-modified PVA, i.e., 0.5 to 40 mol %, preferably 3 to 20 mol %, of the hydroxyl groups of the PVA. With a degree of acetalization of less than 0.5 mol %, the effect of improving the performance of the ink receiving layer is insufficient, as compared with unmodified PVA. With a degree of acetalization of over 40 mol %, the ink receiving layer formed has good water resistance, but its ink absorption deteriorates. With a degree of acetalization of the PVA within the range of 0.5 to 3 mol %, the effect of improving the performance of the ink receiving layer formed can be obtained, but the extent of this improvement cannot be said to be sufficient, as compared with a degree of acetalization of 3 mol % or more. With a degree of acetalization of the PVA within the range of 20 to 40 mol %, the ink absorption of the ink receiving layer formed is improved, but the extent of this improvement cannot be said to be sufficient, as compared with a degree of acetalization of 20 mol % or less.

In view of the adhesion of the ink receiving layer to the substrate, and in view of the water resistance of the ink receiving layer, the content ratio of the unreacted hydroxyl groups of the polyvinyl acetal resin obtained by reaction of the hydroxyl groups of PVA and an aldehyde compound, to the reacted and the unreacted hydroxyl groups, is 10 to 60 mol %, and preferably 30 to 50 mol %. When the ratio of hydroxyl groups of the acetalized PVA is less than 10 mol %, the adhesion of the ink receiving layer to the substrate, particularly, the adhesion to a substrate of a high-polarity material such as glass, metal, plastic or wood, deteriorates, and when the ratio exceeds 60 mol %, the water resistance of the ink receiving layer itself deteriorates.

Although acetalization of PVA is described above, component (A) is not limited to the acetalized product of PVA, and a modified PVA modified with a compound other than an aldehyde compound, which reacts with the hydroxyl groups of PVA in the same manner as acetalization, can be used as component (A). In the present invention, such a modified PVA other than the acetalized product is also referred to as "polyvinyl acetal resin" for the sake of convenience. Examples of modifiers other than aldehyde compounds include carboxyl compounds, epoxy compounds, isocyanate compounds, acid anhydrides, N-methylol compounds, active vinyl compounds, polyvalent metal compounds, and the like. The addition and/or condensation reaction products of these compounds and PVA are generally known.

Component (A) used in the present invention may be a compound obtained by acetalizing PVA with an aldehyde compound and then further modifying the acetalized PVA with a modifier other than the aldehyde compound.

As the monomer having an active energy ray curable ethylenic unsaturated group and used as component (B) in the present invention, a monomer having one ethylenic unsaturated group per molecule is preferably used. Particularly, a hydrophilic monomer having good affinity for aqueous ink is preferably used. For example, at least one selected from the group consisting of polyether-modified mono (meth)acrylates, (meth)acrylamide derivatives, mono (meth)acrylates having an amino group, mono (meth) acrylates having a hydroxyl group, mono (meth)acrylates having a phosphoric group, and nitrogen-containing cyclic vinyl monomers is preferably used.

Examples of such monomers include dimethylacrylamide, polyethylene glycol mono(meth) acrylate, alkyl-substituted (meth)acrylamide, alkoxy-modified (meth)acrylamide, methylol-modified (meth) acrylamide, N,N-dimethylaminoethyl (meth)acrylate, N,N-diethylaminoethyl (meth)acrylate, hydroxyethyl (meth) acrylate, hydroxypropyl (meth)acrylate, polyhydric alcohol diglycidyl ether mono(meth)acrylate, alkylene oxide-modified phosphoric mono(meth)acrylate, caprolactone-modified phosphoric mono(meth)acrylate, acryloyl morpholine, N-vinyl oxazolidone, N-vinyl succinimide, N-vinyl pyrrolidone, N-vinyl caprolactam, and the like.

Examples of commercial products include Prenmer AE-350 and Prenmer PME-400 (Nippon Oil & Fats Co., Ltd.), NK Ester AMP-10G and NK Ester AM-90G (Shin-Nakamura Chemical Industry Co., Ltd.), which are mono (meth)acrylates having a polyethylene glycol unit; N-MAM (Nitto Chemical Industry Co., Ltd.) DMAA (KOHJIN Co., Ltd.), and the like, which are acrylamide derivatives; DMAEA (KOHJIN Co., Ltd.), Light Ester DE (Kyoeisha Chemical Co., Ltd.), and the like, which are (meth)acrylates having an amino group; hydroxyethyl (meth)acrylate, hydroxypropyl (meth)acrylate, Denacol acrylate, DA-100 (Nagase Chemicals Ltd.), which are (meth)acrylates having a hydroxyl group; AR-100 and MR-260 (Daihachi Chemical Industry Co., Ltd.), which are alkylene oxide-modified phosphoric mono(meth)acrylates, nitrogen-containing cyclic vinyl monomers such as acryloyl morpholine, N-vinyl pyrrolidone, and the like.

As the monomer having an active energy ray curable ethylenic unsaturated group, a polyfunctional monomer having at least two ethylenic unsaturated groups in its molecule can also be used. However, the content of such a polyfunctional monomer is preferably 50% by weight or less, and more preferably 10% by weight or less, relative to the amount of the monomer having one ethylenic unsaturated group. In the use of over 50% of polyfunctional monomer, the quality of printing on the ink receiving layer formed significantly deteriorates sometimes, or the recording medium is sometimes deformed due to cure shrinkage in the formation of the ink receiving layer.

If the content of the polyfunctional monomer exceeds 10%, the ink receiving layer exhibits good ink jet printability in a recorded portion with a low printing duty, but the ink receiving layer cannot sufficiently absorb ink in a recorded portion with a high printing duty, and thus causes beading.

Examples of such polyfunctional monomers include condensation products of polyhydric alcohols or polyhydric alcohol condensates and a plurality of (meth)acrylates, such as ethylene glycol di(meth)acrylate, diethylene glycol di(meth)acrylate, polyethylene glycol di(meth)acrylate, glycerin tri(meth)acrylate, and the like; polyvinyl alcohols having at least one functional group selected from N,N'-methylene bis(meth)acrylamide, (meth)acryloyl, haloacryl (meth)acryloyl, and N-methylol acrylamide.

Component (B) is preferably used at a ratio (B)/(A) by weight within the range of 1/100 to 5/1, and more preferably within the range of 10/100 to 3/1, to the polyvinyl acetal resin used as component (A). If the ratio of the component (B) used is less than 1/100, the effect of addition of component (B) to component (A) is not sufficiently obtained, and if the ratio is less than 10/100, the effect of addition is small. Namely, the effect of improving the water resistance of the ink receiving layer formed is insufficient, and the printability of the ink receiving layer itself is not sufficiently improved. If component (B) is used at a ratio (B)/(A) of over 5/1, the absorbing power of the ink receiving layer formed deteriorates, and thus, good printing quality cannot be obtained. This tendency is particularly noticeable in an image with a high printing duty. This tendency gradually occurs when the ratio (B)/(A) of component B exceeds 3/1. In some cases, the recording medium is deformed due to cure shrinkage of the ink receiving layer in the formation of the ink receiving layer.

The cationic resin used as component (C) in the present invention is not limited as long as it contains a cationic portion in its molecule. When an image is recorded on the ink receiving layer containing a cationic compound by using an ink containing a dye, the water resistance and image density of the recorded image are improved, but light resistance tends to deteriorate. Therefore, in order to obtain satisfactory image water resistance and image density by adding the cationic resin in the smallest amount possible, it is preferable to use a cationic resin having a weight average molecular weight of 500 to 50,000, and more preferably 1,000 to 10,000. When the weight average molecular weight is less than 500, the recorded image has insufficient water resistance. When the weight average molecular weight exceeds 50,000, the efficiency of bonding to a dye molecule tends to deteriorate due to molecular structural steric hindrance of the cationic resin, and the addition of a small amount of cationic resin thus has only a small effect.

On the other hand, in recording with an ink containing pigment, the image density is improved, and color mixture at boundaries between different colors with a high printing duty can be prevented. With an ink containing pigment, the use of the cationic resin causes no deterioration in light resistance of the recorded image, but the use of a large amount of cationic resin causes deterioration in the water resistance of the ink receiving layer itself. Therefore, the amount of the cationic resin used must be the necessary minimum.

Examples of cationic resins include polydimethyldiallylammonium chloride, cation-modified polyacrylamide, copolymers of acrylamide and a cationic monomer, polyallylamine, polyaminesulfone, polyvinylamine, polyethyleneimine, polyamide epichlorohydrin resins, polyvinyl pyridinium halides, and the like. Other examples of such cationic resins include copolymers of vinylpyrrolidone monomer and other general monomers, copolymers of vinyloxazolidone monomer and other general monomers, copolymers of vinylimidazole monomer and other general monomers, and the like.

Although the foregoing cationic resins are preferably used, these resins may be used singly or in a mixture of a plurality of resins, and, of course, the cationic resin is not limited to these resins.

The cationic resin used as component (C) in the present invention is preferably used at a ratio (C)/((A)+(B)) by weight within the range of 0.5/100 to 30/100 to the total amount of the polyvinyl acetal resin used as component (A) and the monomer used as component (B). If the ratio is less than 0.5/100, the recorded image formed on the ink receiving layer has insufficient water resistance, and poor long-term storage properties in an environment of high temperature and high humidity. If the cationic resin is used at a ratio of over 30/100, the ink absorptivity of the ink receiving layer formed deteriorates, uniformity in solid printing also deteriorates, bleeding easily occurs in boundaries between images having different colors, and the ink fixing properties tend to deteriorate. The water resistance of the ink receiving layer itself deteriorates. In the use of an ink containing a dye, the light resistance of the recorded image tends to deteriorate.

Besides the above essential components (A), (B) and (C), an alumina hydrate can be added as component (D). The addition of component (D) improves the resistance to fingerprint marks, ink fixing properties, image storage properties, etc. of the ink receiving layer. The addition of component (D) also improves the coating property of a coating solution for forming the ink receiving layer for the substrate, and is thus particularly effective for forming the ink receiving layer by print coating.

Examples of the alumina hydrate used as compound (D) include gibbsite, bayerite, nordstrandite, boehmite, diaspore, and the like.

The alumina hydrate used as component (D) is preferably used at a ratio (D)/((A)+(B)+(C)) by weight within the range of 1/100 to 50/100 to the total of the essential components. If the ratio is less than 1/100, the addition of the alumina hydrate has insufficient effects. With a ratio of over 50/100, the ink absorptivity of the ink receiving layer formed deteriorates, uniformity in solid printing deteriorates, bleeding occurs in boundaries between images having different colors, and the ink fixing properties are also insufficient. In addition, the ink receiving layer itself hardens and thus cannot follow the deformation of the recording medium, thereby causing crazing or peeling of the ink receiving layer.

The coating solution for forming the ink receiving layer may further contain various additives such as a filler, etc. within a range which does not interfere with the achievement of the objects of the present invention. Examples of fillers include silica, alumina, aluminum silicate, magnesium silicate, basic magnesium carbonate, talc, clay, hydrotalcite, calcium carbonate, titanium oxide, zinc oxide, plastic pigments such as polyethylene, polystyrene, polyacrylate and the like. However, the filler is not limited to these fillers.

Examples of other additives include various surfactants, anti-foaming agents, antioxidants, fluorescent brighteners, ultraviolet absorbers, dispersants, viscosity modifiers, pH adjustors, mildewcides, plasticizers, and the like. Any desired additives may be selected from conventional known compounds as needed.

As another component to be contained in the ink receiving layer, any polymer which can receive aqueous ink and which exhibits solubility or affinity for aqueous ink can be used within a range which does not interfere with the achievement of the objects of the present invention. Examples of such polymers include synthetic resins such as polyvinyl alcohol, polyurethane, carboxymethylcellulose, polyester, polyacrylic acid (ester) hydroxyethylcellulose, melamine resins, and modified products thereof; natural resins such as albumin, gelatin, casein, starch, cationic starch, gum arabic, sodium alginate, and the like. However, the other components are not limited to these polymers, and these polymers can be used in combination.

The ink receiving layer is cured by irradiating active energy rays. Examples of such active energy rays include electron rays, ultraviolet rays, $\alpha$-rays, $\beta$-rays, $\gamma$-rays, X-rays, and the like. Of these rays, $\alpha$-rays, $\beta$-rays, $\gamma$-rays and X-rays are dangerous to human bodies, and thus electron rays or ultraviolet rays which are popularly used in the industrial field are preferable.

When the ink receiving layer is cured by using electron rays, the dose of electron rays is generally 0.1 to 100 mrad. With a dose of less than 0.1 Mrad, there is the high possibility that the ink receiving layer will not be completely cured due to the insufficient dose, while with a dose of over 100 Mrad, the ink receiving layer or the substrate might deteriorate. The acceleration voltage of electron rays is about 50 to 300 KeV. Electron rays are applied by a method such as a scanning method, a curtain beam method, a broad beam method or the like. Unlike ultraviolet curing, electron ray irradiation requires no photopolymerization initiator, and thus there is no problem with respect to coloring by the photopolymerization initiator, or the occurrence of odor. Electron ray irradiation also has the effect of improving the productivity of the recording medium and the ink receiving layer.

When the ink receiving layer is cured by using ultraviolet rays, a photopolymerization initiator must be added to the ink receiving layer. Photopolymerization initiators which are generally used for photopolymerization of acrylic monomers can be used. Examples of such photopolymerization initiators include thioxanthone, benzoine, benzoine alkyl ether xanthone, dimethylxanthone, benzophenone, anthracene, 2,2-diethoxyacetophenone, benzyldimethylketal, benzylphenyldisulfide, anthraquinone, 1-chloroanthraquinone, 2-ethylanthraquinone, 2-tert-butylanthraquinone, N,N'-tetraether-4,4'-diaminobenzophenone, 1,1-dichloroacetophenone, and the like. The amount of the photopolymerization initiator used is 0.1 to 10% by weight, and preferably 1 to 5% by weight, relative to the solid contents in the coating solution for forming the ink receiving layer.

The curing reaction may be effected either before or after ink jet recording which will be described below. The method of curing the ink receiving layer before ink jet recording facilitates control up to the time of printing. The method of effecting the curing reaction of the ink receiving layer after ink jet recording improves ink absorptivity and thus improves printing quality because the ink receiving layer is not cured at the time of ink jet recording.

As the substrate of the recording medium used in the present invention, any desired substrate can be appropriately selected from paper such as wood free paper, medium duty paper, art paper, bond paper, regenerated paper, baryta paper, cast coated paper, corrugated paper, resin coated paper, and the like; films or plates of plastics such as polyethylene terephthalate, diacetate, triacetate, cellophane, celluloid, polycarbonate, polyimide, polyvinyl chloride, polyvinylidene chloride, polyacrylate, polyethylene, polypropylene, and the like; and glass plates.

The substrate of the recording medium used in the present invention may have a smooth surface or an uneven surface, and may be transparent, translucent or opaque. A matte layer and a release adhesive may be provided on a side of the substrate opposite the printing surface. Alternatively, an adhesive layer may be provided on the printing surface after printing on the recording medium.

The substrate of the recording medium is appropriately selected from the foregoing substrates in accordance with the purpose of recording on the recording medium, the use of the recorded image, and various conditions such as adhesion to the ink receiving layer coated thereon.

In production of the recording medium of the present invention, the above-mentioned components (A), (B) and (C) or (A), (B), (C) and (D), and, if required, other additives are dissolved or dispersed in water, alcohol, polyhydric alcohol, or another appropriate organic solvent to prepare the coating solution for forming the ink receiving layer.

The thus-obtained coating solution is coated on the surface of the substrate by, for example, a screen printing method, a spin coating method, a roll coater method, a blade coater method, an air knife coater method, a gate roll coater method, a bar coater method, a size press method, a spray coating method, a gravure coating method, a curtain coater method or the like. The substrate is then dried by using, for example, a hot air drying oven or heating drum to obtain a recording medium according to the present invention. The recording medium may further be supercalendered in order to smooth the ink receiving layer or increase the surface strength thereof if required.

The total coating weight (solid content) of the coating solution for forming the ink receiving layer is preferably within the range of 0.2 to 50 $g/cm^2$, more preferably 1 to 30 $g/cm^2$. When the coating weight is less than 0.2 $g/cm^2$, there is no noticeable effect on the coloring properties of the dye, ink absorption capacity, or ink fixing properties of the ink receiving layer formed. On the other hand, with a coating weight exceeding 50 $g/cm^2$, significant curling occurs in a recording medium obtained in an environment of low temperature and low humidity. If the coating weight of the coating solution for forming the ink receiving layer is expressed in terms of thickness after drying, the thickness is preferably within the range of 0.5 to 50 μm.

A known ink can be used for ink jet recording on the recording medium of the present invention. Water-soluble dyes such as direct dyes, acid dyes, basic dyes, reactive dyes, food dyes, and the like; disperse dyes, and pigments can be used as recording agents contained in the ink. Any recording agents which are generally used for ink jet recording can be used without any limitation. From the viewpoint of ionic bonding to the cationic resin contained as component (C) in the ink receiving layer of the recording medium, anionic dyes or pigment dispersions are preferably used.

The recording agent is preferably used at a ratio of 0.1 to 20% by weight to the total amount of the ink. The solvent used for an ink jet recording ink in the present invention is preferably water or a mixed solvent containing water and a water-soluble organic solvent. A mixed solvent containing water and a water-soluble organic solvent is particularly preferable, and a polyhydric alcohol having the effect of preventing ink drying is preferably contained as a water-soluble organic solvent.

A preferable method of recording on the recording medium of the present invention by applying an ink thereto is an ink jet recording method which may use any system capable of effectively releasing an ink from a nozzle and applying the ink to the recording medium. Particularly, the ink jet system disclosed in Japanese Patent Laid-Open No. 54-59936, in which an ink rapidly changes volume due to the action of thermal energy and is ejected from a nozzle by the action of this change of state, can effectively be used.

EXAMPLES

The present invention will be described in further detail below with reference to examples. In the description below, "parts" or "%" means "parts by weight" or "% by weight" unless stated otherwise.

As an apparatus for recording on the recording medium, Bubble Jet Color Printer BJC-600 (trade name) produced by Canon was used. OHP sheet mode was used as the printing mode. Recording on a sheet-shaped recording medium was carried out by using a printer in which the paper feeding part was converted so that the recording medium can be horizontally transferred by a belt.

The polyvinyl acetal resin used in the examples was synthesized by a generally known acetalization technique.

Examples 1 to 18 and Comparative Examples 1 to 6

Tables 1 and 2 show the types and mixing ratios of the polyvinyl acetal resins, monomers, cationic resins and alumina hydrate used for forming the coating solution for forming the ink receiving layer.

Production conditions were as follows:

After the coating solution was coated, the coating was dried at 60° C. for 30 minutes only in Example 14, and at 90° C. for 10 minutes in the other examples and comparative examples.

In all examples and comparative examples, the coating amount after drying was within the range of 10 to 20 $g/m^2$.

In Example 18, the ink receiving layer was cured after ink jet recording, and in the other examples and comparative examples, the ink receiving layer was cured before ink jet recording.

In Examples 14 and 18, the ink receiving layer was cured by applying electron rays with a current of 6 mA and a dose of 3 Mrad, and in the other examples and comparative examples, ultraviolet rays were applied by using an extra-high pressure mercury lamp with a wavelength of 365 nm and 800 $mJ/cm^2$.

TABLE 1

| | | | (A) Polyvinyl acetal resin | | | | (B) Monomer (3) | |
|---|---|---|---|---|---|---|---|---|
| | Substrate | Coating method | PVA (1) | Aldehyde (2) | Degree of acetalization mol % | Hydroxyl group mol % | | (B)/(A) |
| Example 1 | Methacrylic sheet (1 mmt) | Screen printing | PVA220 | BA | 8 | 40 | NK Ester AMP10G | 1 |
| Example 2 | Methacrylic sheet (1 mmt) | Screen printing | PVA220 | BA | 8 | 40 | NK Ester AMP20G | 1 |
| Example 3 | Methacrylic sheet (1 mmt) | Screen printing | PVA220 | BA | 8 | 40 | NK Ester AMP60G | 1 |
| Example 4 | Methacrylic sheet (1 mmt) | Screen printing | PVA220 | BA | 8 | 40 | NK Ester AMP10G | 1 |
| Example 5 | Methacrylic sheet (1 mmt) | Screen printing | PVA220 | BA | 8 | 40 | NK Ester AMP10G | 1 |
| Example 6 | Methacrylic sheet (1 mmt) | Screen printing | PVA220 | BA | 8 | 40 | NK Ester AMP10G | 1 |
| Example 7 | Methacrylic sheet (1 mmt) | Screen printing | PVA220 | BA | 8 | 40 | NK Ester AMP10G | 3 |
| Example 8 | Methacrylic | Screen | PVA220 | BA | 8 | 40 | New Frontier | 10/100 |

TABLE 1-continued

| | | | (A) Polyvinyl acetal resin | | | | (B) Monomer (3) | |
|---|---|---|---|---|---|---|---|---|
| | Substrate | Coating method | PVA (1) | Aldehyde (2) | Degree of acetalization mol % | Hydroxyl group mol % | | (B)/(A) |
| | sheet (1 mmt) | printing | | | | | ME-3 | |
| Example 9 | Methacrylic sheet (1 mmt) | Screen printing | PVA220 | BA | 8 | 40 | NK Ester AMP10G | 50/100 |
| Example 10 | Methacrylic sheet (1 mmt) | Screen printing | PVA220 | BA | 3 | 40 | NK Ester AMP10G | 1 |
| Example 11 | Methacrylic sheet (1 mmt) | Screen printing | PVA220 | BA | 5 | 40 | NK Ester AMP10G | 1 |
| Example 12 | Methacrylic sheet (1 mmt) | Screen printing | PVA220 | BA | 10 | 40 | NK Ester AMP10G | 1 |
| Example 13 | Methacrylic sheet (1 mmt) | Screen printing | PVA220 | BA | 30 | 40 | NK Ester AMP10G | 1 |
| Example 14 | Wood (cedar, 12 mmt) | Screen printing | PVA220 | n-BuA | 8 | 10 | NK Ester AMP10G | 1 |
| Example 15 | Aluminum sheet (1 mmt) | Bar coater | PVA220 | PhAcA | 8 | 30 | NK Ester AMP20G | 1 |
| Example 16 | Methacrylic sheet (1 mmt) | Bar coater | PVA220 | BA | 10 | 60 | NK Ester AMP20G | 1 |
| Example 17 | Methacrylic sheet (1 mmt) | Screen printing | PVA220 | BA | 8 | 40 | NK Ester AMP10G | 1 |
| Example 18 | Methacrylic sheet (1 mmt) | Screen printing | PVA220 | BA | 8 | 40 | NK Ester AMP10G | 1 |
| Comparative Example 1 | Methacrylic sheet (1 mmt) | Screen printing | PVA220 | BA | 8 | 40 | NK Ester AMP10G | 0.5/100 |
| Comparative Example 2 | Methacrylic sheet (1 mmt) | Screen printing | PVA220 | BA | 8 | 40 | NK Ester AMP10G | 6 |
| Comparative Example 3 | White PET | Bar coater | PVA220 | BA | 8 | 40 | NK Ester AMP10G | 1 |
| Comparative Example 4 | White PET | Bar coater | PVA220 | BA | 8 | 40 | NK Ester AMP10G | 1 |
| Comparative Example 5 | Methacrylic sheet (1 mmt) | Screen printing | PVA220 | BA | 8 | 40 | None | — |
| Comparative Example 6 | Methacrylic sheet (1 mmt) | Screen printing | PVA220 | BA | 8 | 40 | NK Ester AMP10G | 1 |

(1) Substrates used were:
White PET film: Merinex 339 (thickness 110 μm) produced by I.C.I Corp.
Methacrylic sheet: Comoglass (thickness 1 mm) produced by Kuraray Co., Ltd.
Aluminum sheet: 5052 material.
Wood: Commercial product (cedar, thickness 12 mm).
(2) PVA was produced by Kuraray Co., Ltd.
(3) BA is benzaldehyde, nBuA is n-butyl aldehyde, and PhAcA is phenylacetaldehyde.
(4) AMP-10G is phenoxyethyl acrylate (Shin Nakamura Chemical Industry Co., Ltd.).
AMP-20G is phenoxydiethylene glycol acrylate (Shin Nakamura Chemical Industry Co., Ltd.).
AMP-60G is phenoxypolyethylene glycol acrylate (Shin Nakamura Chemical Industry Co., Ltd.).
New Frontier ME-3 is methoxytriethylene glycol acrylate (Daiichi Kogyo Seiyaku Co., Ltd.).

TABLE 2

| | (C) Cationic resin (4) | | (D) Alumina hydrate (5) | | (E) Other additives (6) | | |
|---|---|---|---|---|---|---|---|
| | (Molecular weight) | (C)/ (A) + (B) | | (D)/(A) + (B) + (C) | | (E)/(A) + (B) + (C) + (D) | Recording agent (7) |
| Example 1 | PAA-HCL-1L (1000) | 2/100 | AS-100 | 1/100 | DSK-Discoat N-14<br>Darocure 1173 | 1/100<br>3/100 | AD |
| Example 2 | PAA-HCL-1L (1000) | 2/100 | AS-100 | 2/100 | DSK-Discoat N-14<br>Darocure 1173 | 1/100<br>3/100 | AD |
| Example 3 | PAA-HCL-1L (1000) | 2/100 | AS-100 | 5/100 | DSK-Discoat N-14<br>Darocure 1173 | 1/100<br>3/100 | AD |
| Example 4 | PAA-HCL-1L (1000) | 2/100 | AS-100 | 10/100 | DSK-Discoat N-14<br>Darocure 1173 | 1/100<br>3/100 | AD |
| Example 5 | PAA-HCL-1L (1000) | 10/100 | AS-100 | 20/100 | DSK-Discoat N-14<br>Darocure 1173 | 1/100<br>3/100 | AP |
| Example 6 | PAA-HCL-1L (1000) | 10/100 | AS-100 | 50/100 | DSK-Discoat N-14<br>Darocure 1173 | 1/100<br>3/100 | AP |
| Example 7 | PAA-HCL-3L (10000) | 0.5/100 | AS-100 | 10/100 | DSK-Discoat N-14<br>Darocure 1173 | 1/100<br>3/100 | AD |
| Example 8 | PAA-HCL-5L (50000) | 5/100 | AS-100 | 10/100 | Antifros F-102<br>Darocure 1173 | 1/100<br>3/100 | AD |

TABLE 2-continued

| | (C) Cationic resin (4) | | (D) Alumina hydrate (5) | | (E) Other additives (6) | | |
|---|---|---|---|---|---|---|---|
| | (Molecular weight) | (C)/ (A) + (B) | | (D)/(A) + (B) + (C) | | (E)/(A) + (B) + (C) + (D) | Recording agent (7) |
| Example 9 | PAA-HCL-1L (1000) | 5/100 | AS-100 | 10/100 | Antifros F-102<br>Darocure 1173 | 1/100<br>3/100 | AD |
| Example 10 | PAA-HCL-1L (1000) | 5/100 | AS-2 | 10/100 | Antifros F-102<br>Darocure 1173 | 1/100<br>3/100 | AD |
| Example 11 | PAA-HCL-1L (1000) | 5/100 | AS-2 | 10/100 | Antifros F-102<br>Darocure 1173 | 1/100<br>3/100 | AD |
| Example 12 | PAA-HCL-1L (1000) | 5/100 | AS-3 | 10/100 | Antifros F-102<br>Darocure 1173 | 1/100<br>3/100 | AD |
| Example 13 | PAA-HCL-1L (1000) | 20/100 | AS-100 | 10/100 | Antifros F-102<br>Darocure 1173 | 1/100<br>3/100 | AP |
| Example 14 | PAA-HCL-1L (1000) | 30/100 | AS-100 | 10/100 | Antifros F-102 | 1/100 | AP |
| Example 15 | PAA-HCL-1L (1000) | 10/100 | AS-100 | 10/100 | Darocure 1173 | 3/100 | AP |
| Example 16 | PAA_HCL-1L (1000) | 10/100 | None | — | None | — | AP |
| Example 17 | PAA-HCL-1L (1000) | 10/100 | None | — | DSK-Discoat N-14<br>Darocure 1173 | 1/100<br>3/100 | AP |
| Example 18 | PAA-HCL-1L (1000) | 2/100 | AS-100 | 1/100 | DSK-Discoat N-14 | 1/100 | AD |
| Comparative Example 1 | PAA-HCL-1L (1000) | 10/100 | AS-100 | 10/100 | DSK-Discoat N-14<br>Darocure 1173 | 1/100<br>3/100 | — |
| Comparative Example 2 | PAA-HCL-1L (1000) | 10/100 | AS-100 | 10/100 | DSK-Discoat N-14<br>Darocure 1173 | 1/100<br>3/100 | AP |
| Comparative Example 3 | PAA-HCL-1L (1000) | 0.4/100 | AS-100 | 10/100 | DSK-Discoat N-14<br>Darocure 1173 | 1/100<br>3/100 | AP |
| Comparative Example 4 | PAA-HCL-1L (1000) | 40/100 | AS-100 | 10/100 | DSK-Discoat N-14<br>Darocure 1173 | 1/100<br>3/100 | AP |
| Comparative Example 5 | PAA-HCL-1L (1000) | 10/100 | AS-100 | 10/100 | DSK-Discoat N-14<br>Darocure 1173 | 1/100<br>3/100 | — |
| Comparative Example 6 | None | — | None | — | DSK-Discoat N-14<br>Darocure 1173 | 1/100<br>3/100 | AP |

(5) All cationic resins used were produced by Nitto Chemical Industry Co., Ltd.
(6) AS-100 is alumina sols produced by Nissan Chemical Industries, Ltd, and AS-2 and AS-3 are alumina sol produced by Shokubai Kagaku.
(7) Darocure 1173 is a photopolymerization initiator produced by Ciba Geigy Co., Ltd.
(8) AD is an anionic dye, and AP is an anionic pigment.

The color print samples obtained were evaluated with respect to the following items. The results of evaluation are shown in Table 3. Evaluation Items (1) Screen printability (Coating ability)

The coating solution prepared for forming the ink receiving layer was screen-printed on each of the substrates by using a stainless screen (100 mesh, line size 100 $\mu$m). After drying, the print samples were evaluated on the basis of the following criteria:

o: No cells and a surface smoothness range of 1 $\mu$m or less;

Δ: 1 to 10 cells in 100 $mm^2$ or a smoothness range of over 1.0 $\mu$m to 1.5 $\mu$m;

x: Over 10 cells and a smoothness range of over 1.5 $\mu$m.

(2) Image quality

Solid uniformity and boundary bleeding between different colors were evaluated by visual observation on the basis of the following criteria:

o: No problem x: Very poor image quality

Δ: Intermediate to o and x (3) Ink absorption capacity

An image was evaluated on the basis of the following criteria:

o: Clean solid print in 200% printing x: Unclean solid print in 100% printing (4) Water resistance One hour after recording, a recording medium was immersed in water contained in a tray for 10 seconds, and pulled out. After water was wiped off with a Kim towel, water resistance was evaluated by visual observation on the basis of the following criteria:

o: The image hardly changed.

Δ: The ink flowed out or the ink receiving layer swelled, but after drying, the image was recovered to substantially the same as the state before the test.

x: The ink receiving layer swelled, peeled off or was cracked, and, after drying, it was in a state significantly different from the state before the water resistance test.

(5) Resistance to fingerprint marks

After sweaty fingertips were pressed on a recording surface, the surface was wiped with a Kim wipe, and then visually observed. The resistance to fingerprint marks was evaluated on the basis of the following criteria:

o: Fingerprint marks could be completely wiped off.

x: Fingerprint marks could not be completely wiped off.

Δ: Intermediate to o and x.

(6) Image storage properties

An image was recorded on each of the recording media by using the above printer, stored in an environment of 35° C. temperature and 90% humidity for 10 days, and then compared with the image before storage. Image storage properties were evaluated on the basis of the following criteria:

x: Ink overflow, bleeding, or thickening of the characters occurred, and image quality thus significantly deteriorated, as compared with the image quality before storage.

o: No change was observed.

Δ: Intermediate to x and o.

TABLE 3

| | Screen printability | Image quality | Ink absorption capacity | Water resistance | Resistance to fingerprint marks | Image storage properties |
|---|---|---|---|---|---|---|
| Example 1 | ○ | ○ | ○ | ○ | Δ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | Δ | Δ | ○ | ○ | ○ |
| Example 7 | ○ | Δ | Δ | ○ | ○ | Δ |
| Example 8 | Δ | ○ | ○ | ○ | Δ | ○ |
| Example 9 | ○ | ○ | ○ | ○ | ○ | ○ |
| Example 10 | ○ | ○ | ○ | Δ | ○ | ○ |
| Example 11 | ○ | ○ | ○ | ○ | ○ | ○ |
| Example 12 | ○ | ○ | ○ | ○ | ○ | ○ |
| Example 13 | ○ | Δ | Δ | ○ | ○ | ○ |
| Example 14 | ○ | ○ | ○ | Δ | ○ | ○ |
| Example 15 | —* | ○ | ○ | ○ | ○ | ○ |
| Example 16 | —* | ○ | ○ | Δ | ○ | ○ |
| Example 17 | Δ | Δ | Δ | Δ | Δ | ○ |
| Example 18 | ○ | ○ | ○ | ○ | Δ | ○ |
| Comparative Example 1 | x | — | — | — | — | — |
| Comparative Example 2 | ○ | x | x | ○ | ○ | ○ |
| Comparative Example 3 | —* | Δ | Δ | ○ | ○ | x |
| Comparative Example 4 | —* | ○ | ○ | x | Δ | ○ |
| Comparative Example 5 | x | — | — | — | — | — |
| Comparative Example 6 | Δ | x | x | ○ | ○ | ○ |

In Comparative Examples 1 and 5, the coated film had insufficient flatness and contained bubbles, and thus the properties other than screen printability were not evaluated.

* Since coating was carried out by a bar coater, the screen printability was not evaluated.

As described above, the present invention provides a recording medium having an ink receiving layer wherein the coating solution which forms the ink receiving layer has excellent coating property for a substrate. It is thus possible to provide an ink receiving layer having any desired shape on not only a sheet-shaped substrate but also a thick substrate such as a plastic piece, wood piece or glass, without causing the coating solution for the ink receiving layer to flow to the periphery thereof.

The ink receiving layer can be formed in a pattern. The recording medium of the present invention has excellent ink absorption and high ink absorption capacity, and is capable of forming an image having clear dots, a high optical density and high definition. The image recorded on the recording medium, and the ink receiving layer itself are stable and do not deteriorate even if allowed to stand in an environment of high temperature and high humidity for a long time. The recording medium also has excellent resistance to fingerprint marks, and the ink receiving layer and the recording portion thereof have excellent water resistance.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. A method of forming an image by applying an ink to a substrate, the method comprising the steps of:

forming an ink receiving layer by coating, on at least one side of the substrate, a composition comprising a polyvinyl acetal resin (A) having acetal groups, acetyl groups and hydroxyl groups; a monomer (B) having an active energy ray curable ethylenic unsaturated group; and a cationic resin (C); at a weight ratio (B)/(A) within a range of 1/100 to 5/1, and a weight ratio (C)/((A)+(B)) within a range of 0.5/100 to 30/100;

applying an ink to the ink receiving layer by an ink jet method to form an image; and then applying active energy rays to the ink receiving layer to cure the ink receiving layer.

2. A method of forming an image by applying an ink to a substrate, the method comprising the steps of:

forming an ink receiving layer by coating, on at least one side of the substrate, a composition comprising a polyvinyl acetal resin (A) having acetal groups, acetyl groups and hydroxyl groups; a monomer (B) having an active energy ray curable ethylenic unsaturated group; and a cationic resin (C); at a weight ratio (B)/(A) within a range of 1/100 to 5/1, and a weight ratio (C)/((A)+(B)) within a range of 0.5/100 to 30/100;

applying active energy rays to the coating; and then applying an ink to the ink receiving layer by an ink jet method to form an image.

3. An image forming method according to claim 1, further comprising an alumina hydrate as component (D).

4. An image forming method according to claim 2, further comprising an alumina hydrate as component (D).

5. An image forming method according to claim 3, wherein the content ratio of component (D), (D)/[(A)+(B)+(C)], is within the range of 1/100 to 50/100.

6. An image forming method according to claim 4, wherein the content ratio of component (D), (D)/[(A)+(B)+(C)], is within the range of 1/100 to 50/100.

* * * * *

UNITED STATES PATENT AND TRADEMARK OFFICE
CERTIFICATE OF CORRECTION

PATENT NO. : 5,989,650

DATED : November 23, 1999

INVENTOR(S) : TADAYOSHI INAMOTO, ET AL.

It is certified that error appears in the above-identified patent and that said Letters Patent is hereby corrected as shown below:

COLUMN 9:

Line 47, "(ester)" should read --(ester),--.
Line 61, "mrad" should read --Mrad--.

COLUMN 12:

TABLE 1,
" Substrate Coating method PVA(1) Aldehyde (2) "

should read --Substrate (1) Coating method PVA(2) Aldehyde (3) -- and "(B) Monomer (3)" should read --(B) Monomer (4)--.

COLUMN 13:

TABLE 1-continued,
" Substrate Coating method PVA(1) Aldehyde (2) "

should read --Substrate (1) Coating method PVA(2) Aldehyde (3) --

UNITED STATES PATENT AND TRADEMARK OFFICE
CERTIFICATE OF CORRECTION

PATENT NO. : 5,989,650

DATED : November 23, 1999

INVENTOR(S) : TADAYOSHI INAMOTO, ET AL.

It is certified that error appears in the above-identified patent and that said Letters Patent is hereby corrected as shown below:

COLUMN 13:

TABLE 1-continued, and "(B) Monomer (3)" should read --(B) Monomer (4)--.

TABLE 2,

"(C) Cationic resin (4) (D) Alumina hydrate (5) (E) Other additives (6)"

should read

--(C) Cationic resin (5) (D) Alumina hydrate (6) (E) Other additives (7)-- and "Recording agent (7)" should read --Recording agent (8)--.

UNITED STATES PATENT AND TRADEMARK OFFICE

CERTIFICATE OF CORRECTION

PATENT NO. : 5,989,650

DATED : November 23, 1999

INVENTOR(S) : TADAYOSHI INAMOTO, ET AL.

It is certified that error appears in the above-identified patent and that said Letters Patent is hereby corrected as shown below:

COLUMN 15:

TABLE 2-continued,

" (C) Cationic resin (4) (D) Alumina hydrate (5) (E) Other additives (6)"

should read

-- (C) Cationic resin (5) (D) Alumina hydrate (6) (E) Other additives (7)-- and "Recording agent (7)" should read --Recording agent (8)--.

Signed and Sealed this

Nineteenth Day of December, 2000

Attest:

Q. TODD DICKINSON

Attesting Officer

Commissioner of Patents and Trademarks